(12) United States Patent
Miller et al.

(10) Patent No.: US 6,286,249 B1
(45) Date of Patent: Sep. 11, 2001

(54) COUNTERFLOW INSECT TRAP

(75) Inventors: Mark H. Miller, Hope; Bruce E. Wigton, Jamestown; Kenneth Lonngren, West Greenwich, all of RI (US)

(73) Assignee: American Biophysics Corp., East Greenwich, RI (US)

( * ) Notice: Subject to any disclaimer, the term of this patent is extended or adjusted under 35 U.S.C. 154(b) by 501 days.

(21) Appl. No.: 08/718,643

(22) Filed: Sep. 17, 1996

(51) Int. Cl.[7] ........................................... A01M 1/06

(52) U.S. Cl. .................................... 43/139; 43/113

(58) Field of Search .................................... 43/113, 139

(56) References Cited

U.S. PATENT DOCUMENTS

| | | | |
|---|---|---|---|
| 5,647,164 | * | 7/1997 | Yates ........................................ 43/113 |
| 5,669,176 | * | 9/1997 | Miller ........................................ 43/139 |

OTHER PUBLICATIONS

A.J. Grant et al., "Electrophysiological Responses of Receptor Neurons In Mosquito Maxillary Palp Sensilla to Carbon Dixoxide," J. Comp Physiol A(1995) 177: 389–396, Springer–Verlag 1995.

* cited by examiner

Primary Examiner—Kurt Rowan
(74) Attorney, Agent, or Firm—Taylor Russell & Russell P.C.

(57) ABSTRACT

A device for attracting and capturing or otherwise disabling insects includes a fan mechanism structured and arranged to provide an outflow of air out of the device to atmosphere, and to draw an inflow directed counter the outflow from atmosphere into the device, the outflow being substantially within the inflow outside of the device. The flow mechanism is also structured and arranged to provide an insect attractant in the outflow. The device can include mounting structure being adapted to position the device with the outflow directed in a substantially downward direction. The outflow attracts insects to the vicinity of the device, and the inflow urges the insects to enter the device. An insect disabling structure is arranged with the flow mechanism to capture or otherwise disable insects being urged into the device by the inflow.

50 Claims, 5 Drawing Sheets

COUNTERFLOW INSECT TRAP

FIELD OF THE INVENTION

The invention relates to method and device for attracting and trapping or otherwise disabling insects, and, in particular, to a counterflow device that uses an insect attractant in an outflow from the trap.

Suction traps have been used in a variety of configurations to trap or kill insects. It is known to use screened material to trap the insects thus drawn into the trap, and to use mechanical, electrical or poison means to disable, injure or kill the insects. It is also known to use fan mechanisms to generate the suction flow, and to use lights or air-borne attractants to lure the insects to the vicinity of the suction flow. In some configurations, such as disclosed in U.S. Pat. Nos. 3,196,577 (Plunkett) and 5,157,090 (Cody), a small flow of an insect attractant is exhausted from the device to the outside of a much larger suction stream.

For devices using air-borne attractants, the trapping efficiency is related to the type of attractant used, the direction of the attractant, the direction of the suction stream, and the direction of the suction stream relative to the attractant.

SUMMARY OF THE INVENTION

The invention provides a device for attracting and capturing or otherwise disabling insects. The device includes a flow mechanism structured and arranged to provide an outflow of air out of the device to atmosphere, and to draw an inflow directed counter the outflow from atmosphere into the device, the outflow being substantially within the inflow outside of the device. The inflow, therefore, substantially encircles the outflow outside the device. The flow mechanism is also structured and arranged to provide an insect attractant in the outflow. The device can advantageously include mounting structure being adapted to position the device with the outflow directed in a substantially downward direction from an elevation of at least about a foot above ground level. An insect disabling structure is arranged with the flow mechanism to capture or otherwise disable insects being urged into the device by the inflow.

The flow mechanism can include an outflow channel having an opening, a fan mechanism being arranged with the outflow channel to exhaust the outflow to atmosphere, and an inflow channel having at least one opening substantially surrounding the outflow channel opening and through which the inflow is drawn from atmosphere. The outflow channel can include a central space provided within an inner tubular member, the opening of the outflow channel being provided at an open end of the inner tubular member. An outer tubular member having an open end located near the open end of the inner tubular member can be arranged with the inner tubular member to provide a substantially annular-shaped inflow opening therebetween through which the inflow is drawn. The inflow channel can be provided in a substantially annular-shaped region between the inner tubular member and the outer tubular member. A portion of the inner tubular member including the open end can extend beyond the open end of the outer tubular member.

The insect disabling structure can be arranged to communicate with the substantially annular-shaped opening of the inflow channel. The insect disabling structure can include a trap structure arranged to allow ingress and inhibit egress of insects. The insect disabling structure may alternatively or additionally include means for causing injury to insects, such as, for example, an electronic insect killer, a poison delivery system, a mechanical system arranged to cause bodily injury to insects and the like.

A variety of different devices and structures can be used to provide the attractant to the central space for the outflow. For example, a conduit connected to a source of attractant can be arranged to communicate with the central space from outside the inner tubular member. The attractant can include at least one of a pheromone, a kairomone, octenol, carbon dioxide, or any other insect attractant, now known or developed in the future, that can be carried by an air flow. According to one aspect of the invention, at least about 200 ml/min carbon dioxide is provided to the central space. Preferably, at least about 500 ml/min of carbon dioxide is provided to the central space.

According to one aspect of the invention, the inflow channel is connected to the outflow channel, the fan mechanism being arranged to also draw the inflow into the inflow channel. In this arrangement, a second end of the outer tubular member is closed. An annular space provided by the inflow channel communicates with a central space provided by the outflow channel through a distal opening of the inner tubular member distal the open end. A screen material or the like structured to trap insects, which can be a net or mesh bag, is positioned in the central space between the distal opening and the open end. To protect the fan from being fouled by insects drawn into the trap and by insect debris, the fan can be positioned in the central space downstream of the screen material or the like.

According to a different aspect of the invention, a second fan mechanism is arranged with the inflow channel to draw the inflow into the inflow channel. In this arrangement, air can be drawn from atmosphere outside the outer tubular member for mixing with the insect attractant in the outflow. Alternatively, air for mixing with the insect attractant can be drawn from a plenum within the outer tubular member, the outflow fan being positioned to use air from the plenum to generate the outflow. The fan mechanism may also include a screen arranged to inhibit insects in the plenum from entering the central space. In these embodiments, the outer tubular member may include a second end having an opening, the device further having a closed net, screen or the like arranged outside the outer tubular member with a single opening communicating with the opening of the second end of the outer tubular member. The closed net, screen or the like can include, for example, a net bag supported by a frame. The second fan may be positioned upstream and adjacent the single opening of the closed net, screen or the like. Alternatively, instead of a net bag being positioned downstream the second fan, a screen that is structured to inhibit passage of insects can be positioned upstream the second fan. In this arrangement, an annular-shaped cup structure can be positioned to collect dead and dying insects.

The invention also provides a method of urging insects into a device, including emitting a gaseous first flow to atmosphere from an opening of an outflow channel of the device positioned at least about one foot above ground level, directing the first flow towards ground in a substantially downward direction, the first flow including an insect attractant that can be mixed with air. The method further includes drawing a second flow of air into the device, and directing the second flow substantially counter to the first flow and substantially encircling the first flow outside the device, such that insects attracted to the device by the first flow are urged into the device with the second flow. The second flow is advantageously drawn through a channel within the device with a flow velocity that exceeds a maximum flight velocity of a selected variety of insect, such as a variety of mosquito. The method may further include at least one of trapping and causing injury to the insects urged into the device.

The second flow can be drawn into a substantially annular-shaped opening of the device provided between an inner tubular member and an outer tubular member. The first flow can be emitted through an open end of the inner tubular member.

Emitting the gaseous first flow can include emitting at least about 200 ml/min of carbon dioxide, or emitting at least about 500 ml/min of carbon dioxide. The insect attractant may additionally or alternatively include another insect attractant, such as octenol, a kairomone, a pheromone, and the like.

The invention also provides an insect capturing device for use with a suction-type insect trap, including a mesh bag having an opening for coupling to a flow of air being drawn into the trap. The mesh bag is formed of a material structured to allow air to pass freely therethrough while inhibiting passage of insects. A flat ring made of a stiff material supports the bag around the opening. A layer of adhesive is on one side of the ring. A crushable frusto-conical structure is positioned with its wide end at the opening of the mesh bag and its narrow end within the bag. A removable covering is over the layer of adhesive. A score line across the ring permits the ring to be folded upon itself with the covering removed to close the opening.

DESCRIPTION OF THE PREFERRED EMBODIMENTS

Figure 1:
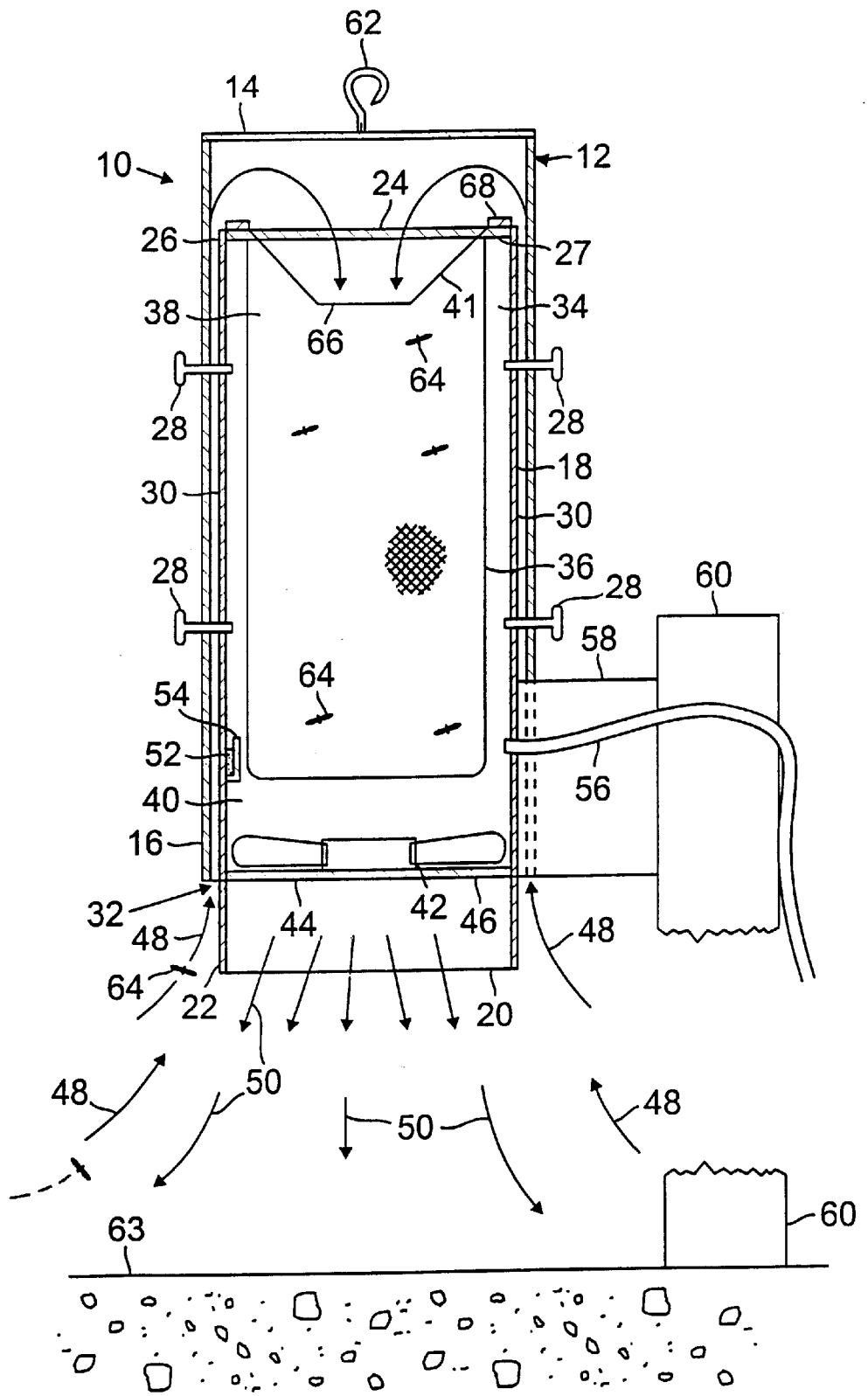
FIG. 1 is a diagrammatic view, in partial longitudinal section, of an insect attracting and trapping device according to the invention.

Referring to the insect trap 10 illustrated in FIG. 1, a vertically positioned cylindrical tubular housing 12 having an enclosed upper end 14 and an open lower end 16 substantially surrounds and covers a cylindrical inner tubular member 18. Tubular member 18 has an outlet opening 20 at its lower end 22, and another opening 24 is provided at an upper end 26 by annular flange 27. Inner tubular member 18 and housing 12 are radially spaced from each other by any suitable mechanical arrangement, such as, for example, by screws 28, so as to create a substantially annular-shaped channel 30 between them. Channel 30 has a substantially annular-shaped inlet 32. Inlet 32 communicates with a central space, or channel 34 provided within tubular member 18 through opening 24 at upper end 26 of tubular member 18. The open lower end 22 of tubular member 18, including outlet opening 20, extends at least to the annular-shaped inlet 32, and preferably a short distance beyond inlet 32.

A mechanism or structure for inhibiting passage of insects but allowing air to pass substantially freely through it is positioned between openings 20 and 24 within central channel 34. A screen material or the like, such as, for example, net or mesh bag 36 hanging from flange 27, can be used to partition central channel 34 into an upper section 38 and a lower section 40. Mesh bag 36 is only open to opening 24 at upper end 26 of tubular member 18. A frusto-conical structure 41 is positioned at opening 24 within mesh bag 36 to encourage insects to enter but not leave bag 38 through opening 24.

A fan 42 is supported within central channel 34 by a plate 44 mounted in the lower end 22 of tubular member 18. In the described embodiment, fan 42 has a nominal 80 mm opening and rotates at about 3000 r.p.m. Plate 44 has openings 46 which allow air exhausted by fan 42 to pass freely. Fan 42 is arranged to create a flow of air (indicated in FIG. 1 by arrows) that is drawn into the device through annular shaped inlet 32, flows up through annular-shaped channel 30, through opening 24 at upper end 26 of tubular member 18, through opening 66 of frusto-conical structure 41, down through central channel 34 and through mesh bag 36, and out through outlet opening 20. Outside device 10, the flow of air 48 being drawn into annular-shaped opening 32 substantially encircles and is directed substantially counter to the flow 50 being exhausted from outlet opening 20. Power can be provided to fan 42 by any suitable and convenient means, such as, for example, batteries, solar panels or line power.

An insect attractant, such as is well known in the art or as may yet be discovered, is mixed with the exhaust flow 50 and discharged though opening 20 of tubular member 18. The attractant can be, for example, an insect pheromone, carbon dioxide, a kairomone, octenol, or any other insect attractant which is known or that may be developed and that can be mixed in an airflow. These attractants can be held within central channel 34 in liquid form 52 by any suitable structure, such as, for example, an open cup 54, or a sponge (not shown) attached to the interior surface of tubular member 18. An insect attractant in solid form (not shown) may be held in central channel 34 by any suitable structure, such as, for example, a clip (not shown). The attractants can also be premixed with air and introduced into central channel 34 by a hose 56 or the like from outside the device 10. Other types of gaseous insect attractants, such as carbon dioxide which is known to attract varieties of mosquitoes, can also be introduced into central channel 34 through hose 56, either premixed with air or undiluted.

Tubular member 18 or housing 12 can be supported in a vertical orientation by a support member 58, which can be, in turn, supported from a post 60 set in the ground, a wall (not shown), or the like. Alternatively, housing can be suspended from a cord or the like by, for example, an eye hook 62 or hanger at the top of housing 12. To capture mosquito species that fly close to the ground 63, device 10 is positioned such that the opening 20 of inner tubular member 18 is at least one foot and preferably about 2–3 feet elevated above ground level. To capture other species, for example some tropical species that fly in the tree canopy, the device 10 can be positioned at a higher elevation. Generally, however, device 10 works best when exhaust flow 50 discharged though opening 20 of tubular member 18 is directed in a substantially downward direction.

In the embodiment illustrated in FIG. 1, housing 12 is removable from tubular member 18 and support 58 by sliding housing 12 upwards, allowing access to mesh bag 36. A slot in the lower portion of housing 12 slips over support 58. Mesh bag 36 can be structured by any suitable arrangement to hang downward from upper end 26 of tubular member 18 and to be removable for insect disposal. In the described embodiment, mesh bag 36 includes a stiff support ring 68 that rests on flange 27. When replaced, housing 12 may be held in position over tubular member 18 with a variety of suitable arrangements. For example, housing 12 may be held in place by a spring catch (not shown), a detent mechanism (not shown), or one or more fasteners, such as screws 28.

Flying insects 64 are drawn toward to the device 10 by following a plume of air containing the attractant. The plume is created by the downward directed exhaust flow 50 from fan 42. It has been observed that some insects tend to follow the upper edge of a flow of air containing an attractant. Accordingly the device 10 is structured such that the inflow 48 is directed to flow near an upper edge of the outflow 50 outside the device. As the insects 64 follow the upper edge of the exhaust plume, they are led naturally to the suction flow 48 being drawn into device 10, and are thereby urged by suction flow 48 to enter channel 30 through substantially annular-shaped opening 32. Once entrained in a suction stream, the insect's natural tendency is to fly upward to avoid danger, which carries the insect 64 further into the device 10. The insects 64 eventually find their way through opening 24 and opening 66 of frusto-conical structure 41 into mesh bag 36 where they are trapped.

Figure 2:
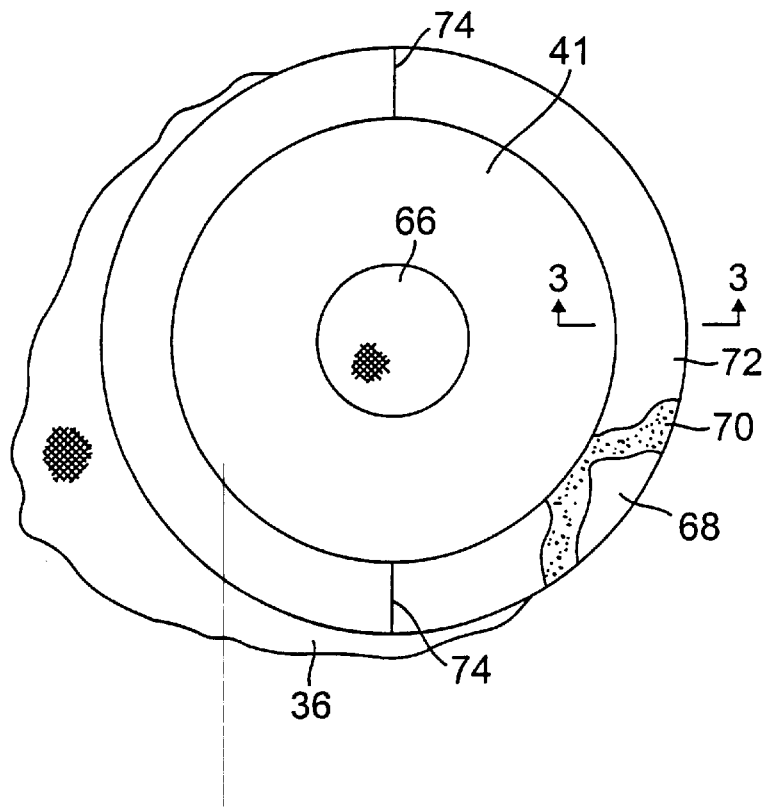
FIG. 2 is a top plan view of a net bag for use with the device illustrated in FIG. 1.

Referring now to FIG. 2, frusto-conical structure 41 can be made of a relatively stiff but crushable, low cost material, such as stiff paper or cardboard. It is inserted in mesh bag 36 when bag 36 is installed. Frusto-conical structure 41 is shaped and sized such that the speed of the air flowing through its smaller opening 66 exceeds the maximum flight speed of a selected variety of insect 64, such as, for example, mosquitoes. This feature allows housing 12 to be removed while fan 42 is operating without allowing insects 64 trapped in bag 36 to escape.

Figure 3:
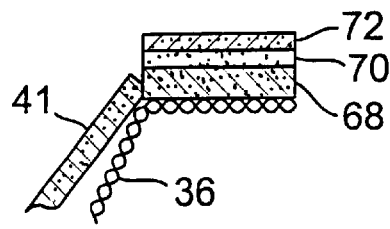
FIG. 3 is a sectional view through line 3—3 of FIG. 2.

Referring now also to FIG. 3, integral with bag 36 at its open end is a ring 68 made of, for example, cardboard, plastic or other low cost material. Frusto-conical structure 41 can be integrally formed with ring 68, glued or otherwise attached to ring 68, or can be a separate article simply inserted into the central opening of ring 68. When installed in device 10, ring 68 rests on top of annular flange 27, with mesh bag 36 extending through opening 24 into channel 34. Ring 68 has a layer of adhesive 70 on its upper surface, covered in turn with a removable wax paper ring 72. Ring 68 is structured to permit preferential folding across a diameter, for example by including a line of weakness, such as score line 74. Before mesh bag 36 is removed from tubular member 18, the wax paper ring 72 is removed to expose the adhesive layer 70. Ring 68 is then folded along score line 74 such that the adhesive layer seals bag 68 with trapped insects 64 and frusto-conical structure 41 inside.

Figure 4:
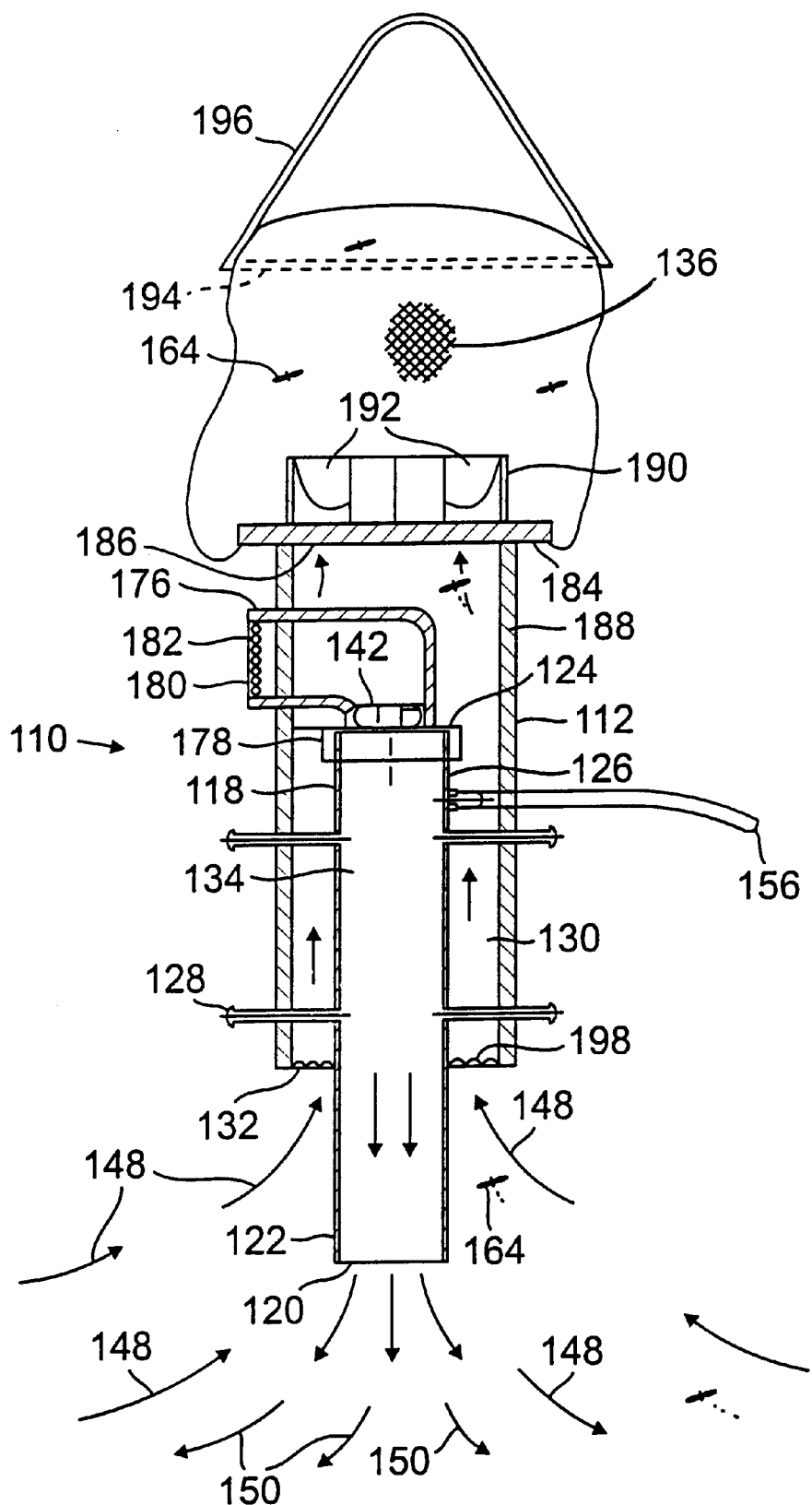
FIG. 4 is a diagrammatic view in partial longitudinal section of a second embodiment to the invention.

Referring now to FIG. 4, another embodiment of an insect trapping device 110 includes an inner tube 118 having openings 120, 124 at respective lower and upper ends 122, 126. An outer tube 112 forming a housing is arranged over and substantially concentric with the inner tube 118 to provide an approximately annular-shaped channel 130 with a substantially annular-shaped inlet opening 132 between them. Opening 132 faces the same direction as opening 120 near the lower end of inner tube 118. A tubular elbow 176 is connected to upper end 126 of inner tube 118 by a flange 178 or the like and extends out from the side of outer tube 112 to atmosphere.

A small fan mechanism 142 is positioned within a channel 134 provided by inner tube 118 and elbow 176 for drawing air in through inlet 180 of elbow 176 and blowing the air out through opening 120 at lower end 122 of inner tube 118. Fan mechanism 142 may include a fan with a nominal 40 mm opening that rotates at about 3000 r.p.m. A conduit, such as hose 156, is connected to inner tube 118 to introduce an insect attractant into the flow of air being blown out of opening 120. A screen 182 is positioned in elbow inlet 180 to prevent insects from being drawn into channel 134 through elbow 176 and fouling fan mechanism 142.

A plate 184 or flange or the like having an outlet opening 186 is mounted over the upper end 188 of outer tube 112. Another, larger fan mechanism 190 mounted on plate 184 is positioned adjacent outlet opening 186. In the illustrated embodiment, fan mechanism 190 includes a fan with a nominal 80 mm opening that rotates at about 3000 r.p.m. Fan mechanism 190 is arranged to draw a flow of air from atmosphere outside the device into the substantially annular-shaped opening 132, through channel 130, and out through the outlet opening 186 at upper end 188 of outer tube 112.

A net or mesh bag 136 is positioned over plate 184 to catch insects 164 that are drawn into channel 130 by fan mechanism 190. Mesh bag may be removably attached to flange 184 with a drawstring closure (not shown), an elastic band (not shown), a hook and loop fastener (not shown) or the like. In the illustrated embodiment, mesh bag 136 includes a support hoop 194 and a hanger 196 for mounting device 110.

Fan mechanism 142 exhausts a mixture of attractant and air from inner tube 118 in a flow 150 directed downwards from opening 120. Fan mechanism 190 draws atmospheric air through annular-shaped opening 132 into channel 130, generating a second flow 148 that substantially encircles exhaust flow 150 and is directed substantially counter to exhaust flow 150. Insects 164 attracted to the vicinity of trap 110 by the attractant flow 150 are encouraged to enter channel 130 by the surrounding counterflow 148 being drawn into opening 132. The second flow 148 generated by fan mechanism 190 within channel 130 draws insects 164 up and through opening 186 into mesh bag 136, where they are retained. The updraft of air from fan mechanism 190 and the spinning blades 192 of fan mechanism 190 help to keep captured insects 164 from leaving mesh bag 136 through opening 186. Channel 130 and fan mechanism 190 may be cooperatively structured and arranged such that the second flow 148 within channel has an upward directed velocity that is greater than a mosquito's maximum flight velocity.

Trap 110 is also structured to disable insects. Some insects 164 traveling through opening 186 may be injured or killed by the rotating blades 192 of fan mechanism 190. A large mesh screen 198 can be used to keep large sized varieties of insects from entering channel 130 and fouling the blades 192. Mesh bag 136 may be sprayed or otherwise treated with an insect poison (not shown), as is known in the art. A poison bait (not shown) may also be placed inside bag 136 or in channel 130.

Figure 5:
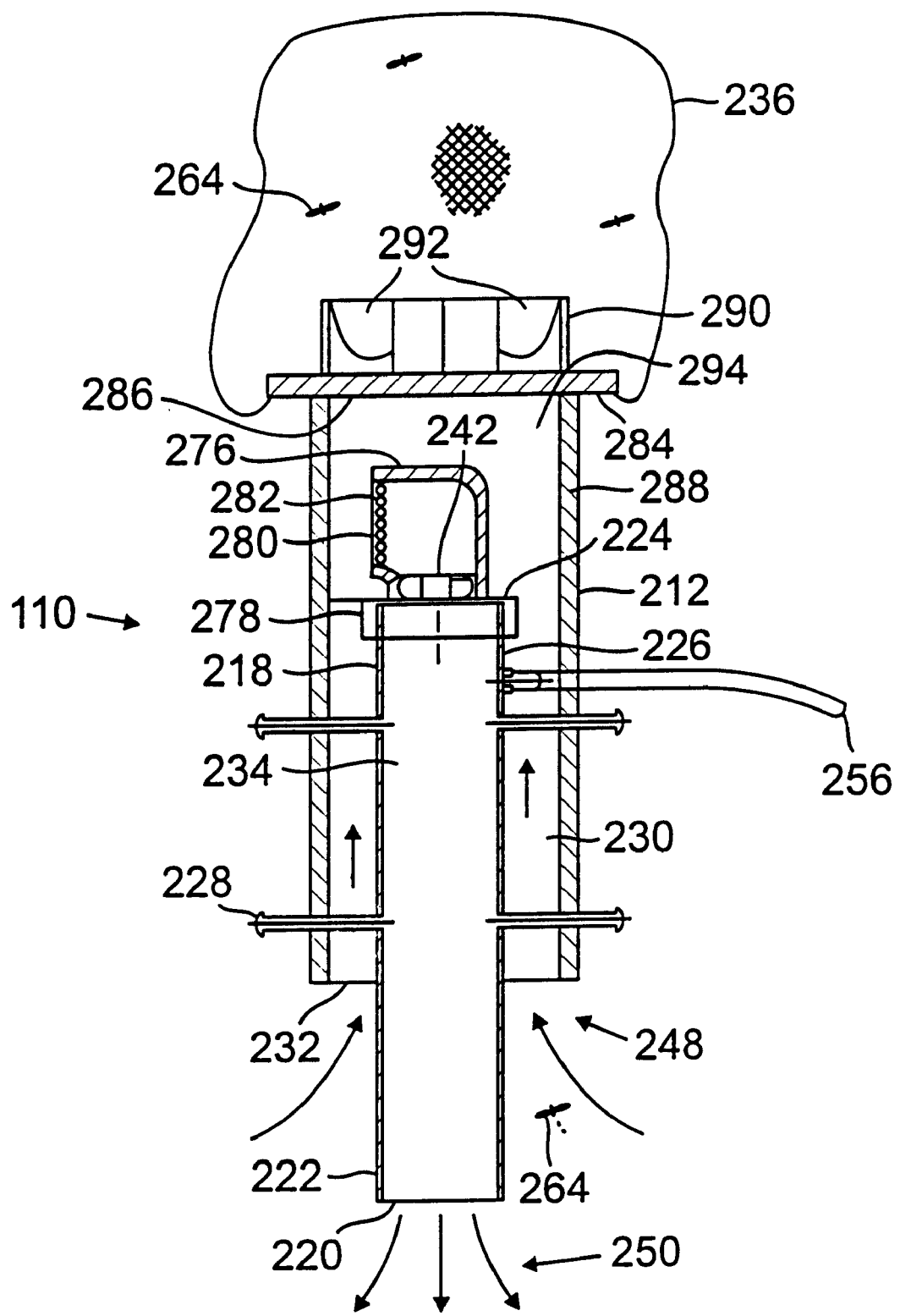
FIG. 5 is a diagrammatic view in partial longitudinal section of a third embodiment of the invention.

Referring now to FIG. 5, another embodiment of an insect trap 210 is structured similarly in most respects to trap 110 described above with reference to FIG. 4. Device 210 includes an inner tube 218 having openings 220, 224 at respective lower and upper ends 222, 226, and a substantially concentric outer tube 212 arranged with inner tube 218 to provide an annular-shaped channel 230 with at an annular shaped opening 232. A fan mechanism 290 mounted to a plate 284 on an upper end 288 of outer tube 212 draws atmospheric air in through opening 232, through channel 230, through opening 286 in plate 284 and into mesh bag 236. Another fan mechanism 242 is mounted on a flange 278 or the like at the upper end 226 of inner tube 218. A hose 256 coupled to a source of insect attractant introduces the attractant to a central channel 234 within inner tube 218. Device 210 differs from device 110 in that the air drawn into central channel 234 by fan mechanism 242 is diverted from a plenum 294 in upper end 288 of outer tube 212, rather than from atmosphere. A screen 282 in an inlet 280 of a fan mechanism housing 276 inhibits insects in channel 230 from entering channel 234.

The embodiments described above include a single central channel through which the outflow with insect attractant is exhausted and a single, substantially annular-shaped outer opening and channel through which an inflow is drawn. The counterflow between the outflow and inflow outside the device, wherein the outflow encircles the inflow, can be produced with other structures. The inflow opening and channel can be more crescent-shaped if the inner and outer tubes are not aligned on the same axis. The tubular members also do not have to be cylindrical. Instead of a single inflow opening or a single outflow opening, several inflow openings or outflow openings may be used.

Figure 6:
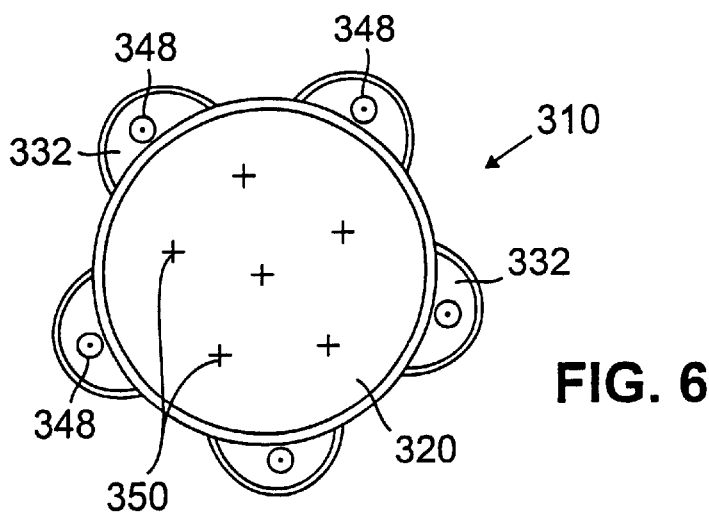
FIG. 6 is a diagrammatic plan view of a bottom end of a fourth embodiment of the invention.

Referring now to FIG. 6, a counterflow insect trap 310 is shown with a central opening 320 through which the outflow 350 (indicated in FIG. 6 with crosses) is exhausted. The inflow 348 (indicated with bullseyes) is drawn through a plurality of inflow openings 332 arrayed around the central opening 320. The insects attracted to the device 310 are urged by the inflow 348 to enter the device through any of inflow openings 332. The inflow openings 332 connect to an outer channel (not shown) which leads to an insect disabling device, such as a trap (not shown) or the like. The remainder of device 310 can be constructed similar to other embodiments as described above.

Figure 7:
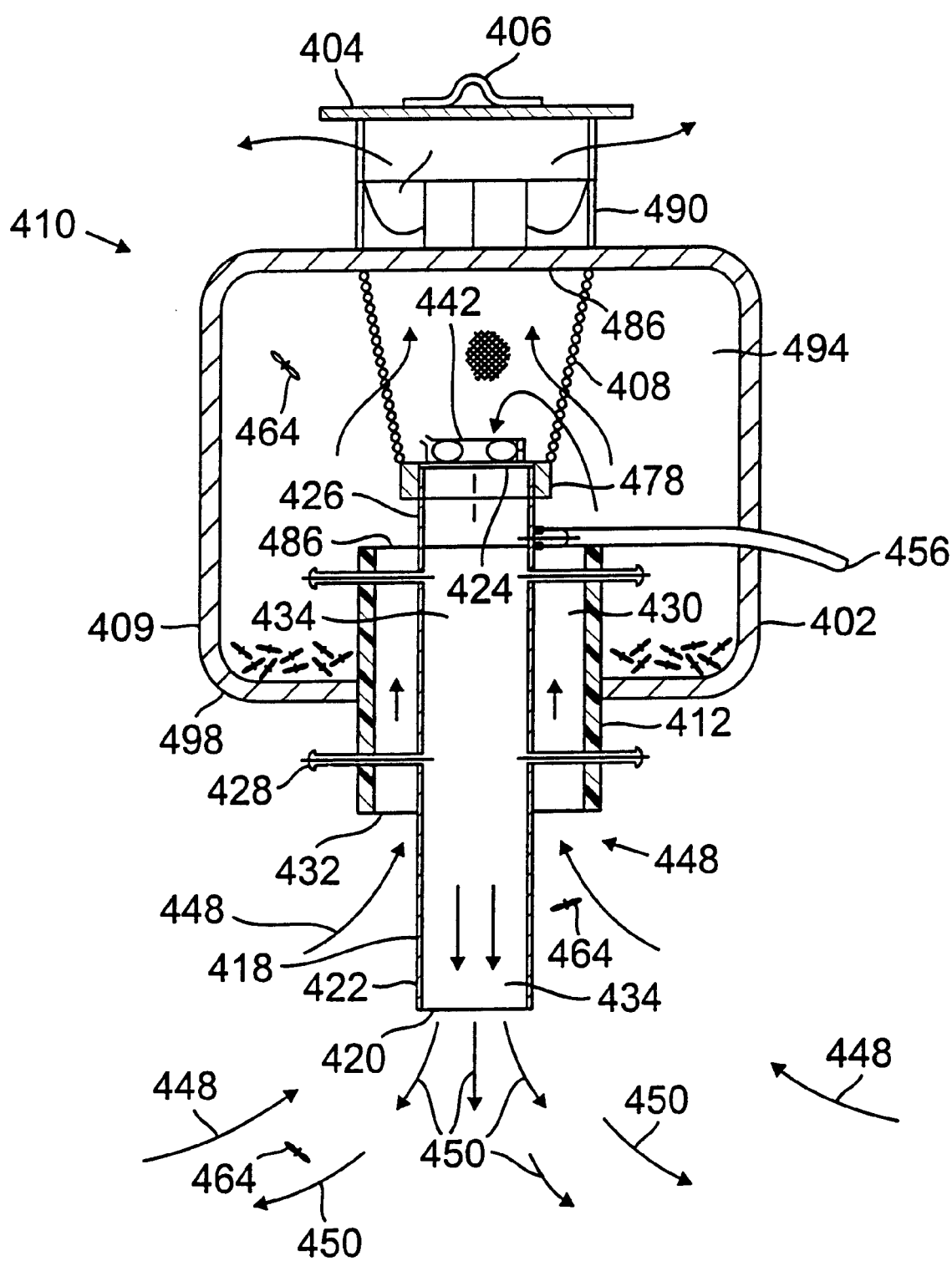
FIG. 7 is a diagrammatic view in partial longitudinal section of a fourth embodiment of the invention.

Referring now to FIG. 7, yet another embodiment of an insect trap 410 includes an inner tube 418 having openings 420, 424 at respective lower and upper ends 422, 426, and a substantially concentric outer tube 412 arranged with inner tube 418 to provide an annular-shaped channel 430 with an annular shaped opening 432. Inner tube 418 and outer tube 412 are held apart by screws 428. Outer tube 412 has another opening 486 at its upper end that opens to a plenum 494 inside of an upper housing 402. Housing 402 is generally pickle-jar shaped. A lower end of upper housing 402 closes around outer tube 412. An upper end of upper housing 402 has an opening 486 above inner tube 418. A small fan mechanism 442 with a 40 mm nominal opening is mounted on a flange 478 or the like at the upper end 426 of inner tube 418. A large fan mechanism 490 with an 80 mm nominal opening is mounted over opening 486 of housing 402. Each fan mechanism 442, 490 operates at about 3000 r.p.m. A cap 404 keeps rain and debris out of fan mechanism 490. An eyelet 406 at the top of cap 404 allows device 410 to be hung from a hook or cord (not shown) above ground level. A mesh screen 408 is positioned between opening 486 and flange 478 to keep insects 464 in plenum 494 from being driven by fan mechanisms 442 or 490 through openings 424 or 486, respectively. A conduit or hose 456 that is coupled to a source of insect attractant introduces the attractant to a central channel 434 within inner tube 418.

Small fan mechanism 442 generates a first flow of air mixed with insect attractant through channel 434 provided inside inner tube 418 and out to atmosphere through opening 420. Large fan mechanism 490 generates a second flow of air that is drawn from atmosphere into device 410 through opening 432, up through channel 430, and into plenum 494. Most of the air in plenum 494 is exhausted by fan mechanism 490 out through opening 486 to atmosphere. Small fan mechanism 442 also draws air from plenum 494 into channel 434 to generate the first flow 450. Thus, each of the fan mechanisms help to draw the second flow 448 through opening 432.

The second flow 448 substantially encircles the first flow 450 outside the device 410. Insects 464, in particular some types of mosquitoes, that are attracted to the device 410 by the attractant travel towards the device along the upper edge of the first flow 450. When the insects approach the device 410, they are urged by the second flow 448 into channel 430 through opening 432, then into plenum 494. Some insects, such as mosquitoes, use visual cues to avoid flying into objects. Therefore, in the described embodiment, outer tube 412 and inner tube 418 are fabricated of clear materials, such as, for example, a clear plastic, a clear acrylic or the like, so that the insects will not try to avoid approaching close to opening 432.

Once inside plenum 494, mesh screen 408 blocks the insects 464 from exiting through opening 424 or opening 486. Second flow 448 is of sufficient velocity as it enters plenum 494 from channel 430 to inhibit insects from going back into channel 430. Preferably, the flow velocity of the second flow in channel 430 is greater than the maximum flight velocity of a mosquito, or greater than about 6–7 m.p.h. The insects 464 in plenum 494, being unable to escape, become exhausted and desiccated, and drop to the bottom of housing 402. Housing 402 and outer tube 412 are together structured to form an annular-shaped cup 409 to catch the fallen insects 498.

The insect disabling mechanisms described above with reference to the embodiment illustrated in FIG. 4 can be used with other embodiments as well. In addition, other disabling mechanisms now known or to be discovered, such as, for example, an electric grid, can be incorporated into an insect trapping and disabling device according to the invention. A light may be incorporated into a device made according to the invention to assist in attracting insects. Moreover, devices made according to the invention may include an insect trapping device and not an insect disabling device, an insect disabling device and not an insect trapping device, or both a trapping and a disabling device.

The traps disclosed above with reference to the drawing may be used to capture and disable a wide variety of insect species using one or more insect attractants. A field trial was conducted in late August near Gainesville, Fla. using a counterflow insect trap structured similarly to device 210, which is described above with reference to FIG. 5. In this trial, a $CO_2$ flow of 500 ml/min was introduced into the central channel of the inner tube. An octenol attractant was also positioned outside of the outer tube. In a twelve hour period, the counterflow device trapped 1725 insects, the vast majority of which were varieties of mosquito, including 507 *Ae. atlanticus,* 212 Ae. *infirmatus,* 689 *An. crucians,* 115 *Cq. perturbans, and* 102 *Cx. malanoconion.* It is expected that further improvements can be made by adjusting flow rates and amounts and types of attractant.

Other embodiments are within the scope of the following claims.

What is claimed is:

1. A device for attracting insects, comprising a flow mechanism including an outflow channel structured and arranged to provide an outflow comprised of air and an insect attractant out of the device to atmosphere, and an inflow channel structured and arranged to draw an inflow directed counter the outflow from atmosphere into the device through the inflow channel, the outflow being substantially within the inflow outside of the device.

2. The device of claim 1, wherein the inflow urges insects into the device through the inflow channel.

3. The device of claim 1, further comprising mounting structure being adapted to position the device with the outflow directed towards ground in a substantially downward direction.

4. The device of claim 1, further comprising insect disabling structure being arranged with the flow mechanism to capture or otherwise disable insects being urged into the device by the inflow.

5. The device of claim 1, wherein the flow mechanism is comprised of a fan mechanism arranged with the outflow channel to exhaust the outflow to atmosphere.

6. The device of claim 5, wherein the inflow channel is connected to the outflow channel, the fan mechanism being further arranged to draw the inflow into the inflow channel.

7. The device of claim 5, wherein a second fan mechanism is arranged with the inflow channel to draw the inflow into the inflow channel.

8. The device of claim 4, wherein the disabling structure comprises a mesh screen.

9. The device of claim 1, wherein the outflow is smaller than the inflow.

10. An insect trap, comprising:
an inner tube having open first and second ends and defining a central space therebetween;
an outer tube including a closed second end proximate the second end of the inner tube, the outer tube being structured and arranged with the inner tube to provide a channel therebetween, the channel having a substantially annular-shaped opening proximate the first end of the inner tube and communicating with the central space through the second opening of the inner tube;
a screen dividing the central space into a first section communicating with the first end of the inner tube and a second section communicating with the second end of the inner tube, the screen inhibiting passage of flying insects between the first and second sections while allowing air to flow therebetween;
an attractant introducer structured and arranged to provide an insect attractant to the central space;
a fan mechanism positioned to draw a flow of air into the substantially annular-shaped opening, through the channel, through the open second end of the inner tube, through the central space, to mix the flow of air with the insect attractant, and to blow the flow of air mixed with the insect attractant out the open first end of the inner tube such that the flow of air mixed with attractant is substantially encircled outside the device by the flow of air being drawn into the substantially annular-shaped opening and is directed substantially counter thereto.

11. An insect trap, comprising:
an inner tube having open first and second ends and providing a central space therebetween;
an outer tube being structured and arranged with the inner tube to provide a channel therebetween, the channel having a substantially annular-shaped opening proximate the first end of the inner tube and an opening at an opposite end of the outer tube;
a first fan mechanism structured and arranged to draw a first flow of air from atmosphere outside the device into the substantially annular-shaped opening, through the channel, and out through the opening at the opposite end of the outer tube;
a disabling device structured and arranged to disable insects passing through the channel;
an attractant introducer structured and arranged to provide an insect attractant to the central space;
a second fan mechanism structured and arranged to mix a second flow of air with the insect attractant, and to blow the second flow of air mixed with the insect attractant out the open first end of the inner tube such that the second flow is substantially encircled outside the device by the first flow of air being drawn into the substantially annular-shaped opening and is directed substantially counter thereto.

12. The insect trap of claim 11, wherein the second end of the inner tube opens to atmosphere outside the outer tube distal the open end of the inner tube.

13. A device for attracting insects, comprising:
a first flow mechanism structured and arranged to generate a gaseous first flow which includes an insect attractant; and
a second flow mechanism structured and arranged to draw a second flow of air into the device, wherein the second flow substantially encircles the first flow and is directed substantially counter to the first flow outside the device.

14. The device of claim 13, wherein
the first flow mechanism includes a first fan being structured and arranged to generate the first flow and an inner tubular member providing a central space and having an open end through which the first flow is channeled to atmosphere outside the device, and
the second flow mechanism includes an outer tubular member having an open end, the tubular members being arranged to provide a substantially annular-shaped opening therebetween through which the second flow is drawn.

15. The device of claim 14, further comprising mounting structure for arranging the device in a position wherein the first flow is directed in a substantially downward direction.

16. The device of claim 15, further comprising insect disabling structure being arranged to communicate with the substantially annular-shaped opening, the insect disabling structure including at least one of a trap structure arranged to allow ingress and inhibit egress of insects, and means for causing injury to insects.

17. The device of claim 15, wherein a portion of the inner tubular member including the open end extends beyond the open end of the outer tubular member.

18. The device of claim 15, wherein the second flow mechanism also includes the first fan, the first fan being structured and arranged to generate both the first and the second flows.

19. The device of claim 18, wherein a second end of the outer tubular member is closed, the annular space communicates with the central space through a distal opening of the inner tubular member distal the open end, and a screen material or the like structured to trap insects is positioned in the central space between the distal opening and the open end.

20. The device of claim 19, wherein the first fan is positioned in the central space downstream of the screen material or the like.

21. The device of claim 14, wherein the second fan mechanism further includes a second fan structured to generate the second flow.

22. The device of claim 21, wherein the outer tubular member comprises a second end having an opening, the device further comprising a net bag or the like arranged outside the outer tubular member with a single opening communicating with the opening of the second end of the outer tubular member, and wherein the second fan is positioned upstream and adjacent the single opening of the net bag or the like.

23. The device of claim 21, wherein the inner tubular member comprises a second end opening to atmosphere outside the outer tubular member distal the open end of the inner tubular member.

24. The device of claim 21, wherein the inner tubular member comprises a second end arranged to communicate with a plenum within the outer tubular member, the first fan being positioned to use air from the plenum to generate the first flow.

25. The device of claim 24, wherein the first flow mechanism includes a screen arranged to inhibit insects in the plenum from entering the central space.

26. The device of claim 21, wherein the outer tubular member comprises a second end having an opening, the second fan being positioned to cause the second flow to flow out the opening of the second end, the device further comprising a mesh screen structured to inhibit passage of insects through the second fan.

27. The device of claim 26, wherein the device further comprises an outer housing coupled at one end to the outer tubular member and providing a substantially annular-shaped cup structure therewith, the outer housing providing a plenum and including an opening at which the second fan is mounted, the cup being adapted to catch insects blocked by the mesh screen.

28. The device of claim 13, wherein the attractant comprises at least one of a pheromone, a kairomone, octenol and carbon dioxide.

29. The device of claim 14, wherein the first flow mechanism further includes a conduit communicating with the central space from outside the inner tubular member.

30. The device of claim 19, wherein the screen material or the like includes:
a mesh bag having an opening for coupling to the inflow being drawn into the device, the mesh bag being formed of a material structured to allow air to pass freely therethrough while inhibiting passage of insects;
a flat ring supported on a distal end of the inner tubular member, the flat ring being fabricated of a stiff material and supporting the bag around the opening of the bag such that the bag extends into the interior space;
a layer of adhesive on one side of the flat ring;
a removable covering over the layer of adhesive; and
wherein the ring is structured to permit the ring to be folded upon itself with the covering removed to close the opening.

31. The device of claim 13, further comprising a mesh screen being arranged with the flow mechanism to capture insects being urged into the device with the second flow.

32. The device of claim 13, wherein the first flow is smaller than the second flow.

33. An insect trapping device, comprising:
a first channel having an opening;
a second channel having at least one opening, wherein the at least one opening substantially surrounds the opening of the first channel;
a fan mechanism structured and arranged with the first and second channels to exhaust a gaseous first flow out the first channel to atmosphere outside the device, the first flow including an insect attractant, and to draw a second flow of atmospheric air from outside the device through the at least one opening into the second channel, the second flow substantially encircling the first flow outside the device and being directed substantially counter thereto; and
a trap structured and arranged to permit the second flow to pass therethrough while trapping insects that enter the trapping device through the second channel with the second flow.

34. The device of claim 33, wherein the fan mechanism includes a single fan for exhausting the first flow and for drawing the second flow.

35. The device of claim 33, wherein the fan mechanism includes a first fan for exhausting the first flow and a second fan for drawing the second flow.

36. A method of urging insects into a device, comprising:
emitting a gaseous first flow to atmosphere from the device, the first flow including an insect attractant; and
drawing a second flow of air into the device, including directing the second flow substantially counter to the first flow and substantially encircling the first flow outside the device;
attracting insects to the second flow with the insect attractant in the first flow; and
urging the attracted insects into the device with the second flow.

37. The method of claim 36, wherein emitting the gaseous first flow includes directing the first flow in a substantially downward direction.

38. The method of claim 36, wherein drawing the second flow includes drawing the second flow into a substantially annular-shaped opening of the device provided between an inner tubular member and an outer tubular member, and emitting includes emitting the first flow through an open end of the inner tubular member.

39. The method of claim 36, further comprising at least one of trapping and causing injury to the insects urged into the device.

40. The method of claim 36, wherein drawing the second flow includes drawing the second flow through a channel within the device with a flow velocity that exceeds a maximum flight velocity of a mosquito.

41. The method of claim 36, wherein the insect attractant comprises carbon dioxide.

42. The method of claim 41, wherein emitting the gaseous first flow includes emitting at least about 200 ml/min of carbon dioxide.

43. The method of claim 41, wherein the insect attractant further comprises octenol.

44. The method of claim 36, further comprising trapping the insects urged into the device with the second flow.

45. The method of claim 36, wherein the first flow is smaller than the second flow.

46. A method of disabling insects, comprising:
providing a device that includes an outflow channel and an inflow channel, each having an opening to atmosphere;
attracting insects to the device, including directing an outflow of air mixed with an insect attractant in a substantially downward direction from the opening of the inflow channel;
urging the attracted insects to enter the opening of the inflow channel, including directing an inflow of air around the outflow and counter thereto outside the device, and drawing the inflow into the inflow channel through the opening of the inflow channel; and
disabling insects entering the inflow channel.

47. The method of claim 46, wherein disabling the insects entering the inflow channel includes trapping the insects with a mesh screen material.

48. A device for attracting insects, comprising a flow mechanism including an outflow channel structured and arranged to provide an outflow comprised of air and an insect attractant out of the device to atmosphere, and an inflow channel structured and arranged to draw an inflow directed counter the outflow from atmosphere through the inflow channel into the device, the inflow being directed to flow near an upper edge of the outflow outside the device.

49. The device of claim 48, wherein the outflow is directed from the device towards ground.

50. The device of claim 48, further comprising a mesh screen or the like being arranged with the flow mechanism to capture insects being urged into the device through the inflow channel.

\* \* \* \* \*

UNITED STATES PATENT AND TRADEMARK OFFICE
CERTIFICATE OF CORRECTION

PATENT NO.   : 6,286,249 B1                                        Page 1 of 1
DATED        : September 11, 2001
INVENTOR(S)  : Miller et al.

It is certified that error appears in the above-identified patent and that said Letters Patent is hereby corrected as shown below:

Title page,
Item [56], U.S. PATENT DOCUMENTS, the following references should be added:
-- 5,417,009         05/23/95      Butler et al.
   5,329,725         07/19/94      Bible
   5,311,697         05/17/94      Cavanaugh et al.
   5,301,458         04/12/94      Deyoreo et al.
   5,205,065         04/27/93      Wilson et al.
   5,167,090         12/01/92      Cody
   5,157,865         10/27/92      Chang
   3,196,577         07/27/65      Plunkett
   2,893,161         07/07/59      Reid
   1,693,368         11/27/28      Cherry --
Before, OTHER PUBLICATIONS, please insert:
-- FOREIGN PATENT DOCUMENTS
FR  717.903          01/16/32      France --
OTHER PUBLICATIONS, the following reference should be added:
-- Sudia and Chamerlain, Journal of the American Mosquito Control Association
4: 536-538, 1988 --

Signed and Sealed this

Twenty-eighth Day of October, 2003

JAMES E. ROGAN
*Director of the United States Patent and Trademark Office*

US006286249C1

(12) EX PARTE REEXAMINATION CERTIFICATE (4860th)
United States Patent
Miller et al.

(10) Number: US 6,286,249 C1
(45) Certificate Issued: Oct. 7, 2003

(54) COUNTERFLOW INSECT TRAP

(75) Inventors: Mark H. Miller, Hope, RI (US); Bruce E. Wigton, Jamestown, RI (US); Kenneth Lonngren, West Greenwich, RI (US)

(73) Assignee: American Biophysics Corp., Jamestown, RI (US)

Reexamination Request:
No. 90/006,156, Nov. 8, 2001

Reexamination Certificate for:
Patent No.: 6,286,249
Issued: Sep. 11, 2001
Appl. No.: 08/718,643
Filed: Sep. 17, 1996

(51) Int. Cl.$^7$ ................................................ A01M 1/06
(52) U.S. Cl. .......................................... 43/139; 43/113
(58) Field of Search ..................................... 43/113, 139

(56) References Cited

U.S. PATENT DOCUMENTS 5,255,468 A    10/1993   Cheshire, Jr. .................. 43/113

OTHER PUBLICATIONS

Mosquito Ecology Field Sampling Methods, $2^{nd}$ Ed., 1993, pp. 500, 502, 517, 524 and 546–547.
Mosquito News, vol. 27, No. 1, Mar. 1967, pp. 90–92.
D.G. Peterson and A.W A. Brown, "Studies of the Responses of the Female Aedes Mosquito, Part III; The Response of the Aedes Aegypti (L.), to a Warm Body and its Radiation", Biting Insect Technology, pp. 535–541 (1951).
R. R. Carestia and L. B. Savage, *Effectiveness of Carbon Dioxide as a Mosquito Attractant in the CDC Miniature Light Trap*, J. American Mosquito Control Assn. 27(1): 90–92 (Mar. 1967).
M. W. Service, *Mosquito Ecology Field Sampling Methods* ch. 5, Sampling Adults by Animal Bait Catches and by Animal–Baited Traps, 349 ($2^{nd}$ ed. 1995).
M. W. Service, *Mosquito Ecology Field Sampling Methods* ch. 6, Sampling Adults by Carbon Dioxide Traps, Light Traps, Visual Attraction Traps and Sound Traps, 499 ($2^{nd}$ ed. 1995).
T. G. Floore, A. H. Boike, Jr., C. B. Rathburn, Jr., L. A. Sizemore and K. L. King, *Mosquito Trapping Studies to Determine the Efficacy of Two Models of the Flowtron® Mosquito Luring Device* J. Florida Anti–Mosquito Association 51(1): 13–17 (1985).
Dipteran Collection Equipment Folder, American Biophysics Corporation.
Owner's Manual, BugVac™ Model 1101 Electronic Insect Killer.
Daniel I. Kline, *Comparison of Two American Biophysics Mosquito Traps: The Professional and a New Counterflow Geometry Trap* J. American Mosquito Control Assn. 15(3): 276–282 (1999).
Douglas A. Burkett, Won J. Lee, Kwan W Lee, Heung C. Kim, Hee I. Lee, Jong S. Lee, E. H. Shin, Robert A. Wirtz, Hae W. Cho, David M. Claborn, Russell E. Coleman, and Terry A. Klein, *Light, Carbon Dioxide, and Octenol–Baited Mosquito Trap and Host–Seeking Activity Evaluations for Mosquitoes in a Malarious Area of the Republic of Korea* J American Mosquito Control Assn. 17(3): 196–205 (2001).

*Primary Examiner*—Darren W. Ark

(57) ABSTRACT

A device for attracting and capturing or otherwise disabling insects includes a fan mechanism structured and arranged to provide an outflow of air out of the device to atmosphere, and to draw an inflow directed counter the outflow from atmosphere into the device, the outflow being substantially within the inflow outside of the device. The flow mechanism is also structured and arranged to provide an insect attractant in the outflow. The device can include mounting structure being adapted to position the device with the outflow directed in a substantially downward direction. The outflow attracts insects to the vicinity of the device, and the inflow urges the insects to enter the device. An insect disabling structure is arranged with the flow mechanism to capture or otherwise disable insects being urged into the device by the inflow.

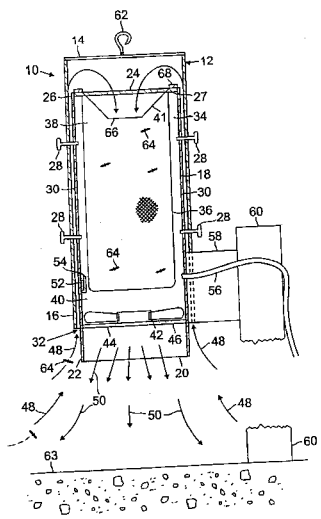

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–18, 28, 29 and 31–45 is confirmed.

Claims 19, 21, 46 and 48 are determined to be patentable as amended.

Claims 20, 22–27, 30, 47, 49 and 50, dependent on an amended claim are determined to be patentable.

19. The device of claim 18, wherein a second end of the outer tubular member is closed, the annular [space] *opening* communicates with the central space through a distal opening of the inner tubular member distal the open end, and a screen material or the like structured to trap insects is positioned in the central space between the distal opening and the open end.

21. The device of claim 14, wherein the second [fan] *flow* mechanism further includes a second fan structured to generate the second flow.

46. A method of disabling insects, comprising:

providing a device that includes an outflow channel and an inflow channel, each having an opening to atmosphere;

attracting insects to the device, including directing an outflow of air mixed with an insect attractant in a substantially downward direction from the opening of the inflow channel;

urging the attracted insects to enter the opening of the inflow channel, including directing an inflow of air [around] *substantially encircling* the outflow and counter thereto outside the device, and drawing the inflow into the inflow channel through the opening of the inflow channel; and disabling insects entering the inflow channel.

48. A device for attracting insects, comprising a flow mechanism including an outflow channel structured and arranged to provide an outflow comprised of air and an insect attractant out of the device to atmosphere, and an inflow channel structured and arranged to draw an inflow directed counter the outflow from atmosphere through the inflow channel into the device, the inflow *substantially encircling the outflow outside the device and* being directed to flow near an upper edge of the outflow outside the device.

* * * * *